(12) United States Patent
Michler et al.

(10) Patent No.: US 10,577,025 B2
(45) Date of Patent: Mar. 3, 2020

(54) MODULE SUPPORT ASSEMBLY FOR A MOTOR VEHICLE

(71) Applicant: Kirchhoff Automotive Deutschland GmbH, Attendorn (DE)

(72) Inventors: Stefan Michler, Attendorn (DE); Lukasz Duszlak, Mielec (PL); Albert Matwich, Meinerzhagen (DE); Josef Bartzik, Iserlohn (DE); Christoph Meisterjahn, Sundern (DE)

(73) Assignee: KIRCHHOFF AUTOMOTIVE DEUTSCHLAND GMBH, Attendorn (DE)

( * ) Notice: Subject to any disclaimer, the term of this patent is extended or adjusted under 35 U.S.C. 154(b) by 143 days.

(21) Appl. No.: 15/538,589

(22) PCT Filed: Jan. 12, 2016

(86) PCT No.: PCT/EP2016/050461
§ 371 (c)(1),
(2) Date: Jun. 21, 2017

(87) PCT Pub. No.: WO2016/120061
PCT Pub. Date: Aug. 4, 2016

(65) Prior Publication Data
US 2018/0001935 A1    Jan. 4, 2018

(30) Foreign Application Priority Data

Jan. 30, 2015   (DE) .................. 10 2015 101 393

(51) Int. Cl.
*B62D 1/02*    (2006.01)
*B62D 1/16*    (2006.01)
(Continued)

(52) U.S. Cl.
CPC ............. *B62D 25/145* (2013.01); *B62D 1/02* (2013.01); *B62D 1/046* (2013.01); *B62D 1/16* (2013.01);
(Continued)

(58) Field of Classification Search
CPC ...... B62D 25/145; B62D 25/147; B62D 1/16; B62D 1/20; B62D 27/023
See application file for complete search history.

(56) References Cited

U.S. PATENT DOCUMENTS 3,897,848 A * 8/1975 Arnstson ............... B60R 21/045
                                                              180/90
4,355,820 A * 10/1982 Kitagawa ............. B62D 25/145
                                                              280/779
(Continued)

FOREIGN PATENT DOCUMENTS

DE    102004013343 A1    11/2005
DE    102005030934 A1    1/2007
(Continued)

OTHER PUBLICATIONS

International Search Report dated May 11, 2017 in parent International application PCT/EP2016/050461.
(Continued)

*Primary Examiner* — Barry Gooden, Jr.
(74) *Attorney, Agent, or Firm* — Polsen Intellectual Property Law, PC; Margaret Polsen; Christopher Sylvain

(57) ABSTRACT

A module carrier assembly for positioning between the A-pillars of a motor vehicle body comprising a transverse carrier configured as a hollow body profile and at least one steering column holder connected to the transverse carrier and supported at the outer side of the transverse carrier in the x-direction. The at least one steering column holder is configured as an angle piece and is supported by a support (Continued)

surface provided by a first limb at a first outer wall of the transverse carrier. The steering column holder has a further limb extending below the transverse carrier. The steering column holder carries a support projection which extends through the outer wall of the transverse carrier adjoining the support surface of the steering column holder and up to at least the opposite wall of the transverse carrier. The support projection is connected in a vibration-coupled manner to this opposite wall.

10 Claims, 3 Drawing Sheets

(51) Int. Cl.
    *B62D 25/14*    (2006.01)
    *B62D 1/04*     (2006.01)
    *B62D 1/20*     (2006.01)
    *B62D 27/02*    (2006.01)

(52) U.S. Cl.
    CPC ............... *B62D 1/20* (2013.01); *B62D 25/14* (2013.01); *B62D 27/023* (2013.01); *B60K 2370/87* (2019.05)

(56) References Cited

U.S. PATENT DOCUMENTS

| | | | | |
|---|---|---|---|---|
| 4,362,319 A * | 12/1982 | Masaki | ................ | B62D 25/145 280/779 |
| 4,365,826 A * | 12/1982 | Iriyama | ................ | B60H 1/242 180/90 |
| 4,432,565 A * | 2/1984 | Suzuki | ................ | B62D 25/145 180/90 |
| 4,671,536 A * | 6/1987 | Yoshimura | ............ | B62D 25/145 280/779 |
| 4,682,788 A * | 7/1987 | Yoshimura | ............ | B62D 25/145 280/779 |
| 4,703,669 A * | 11/1987 | Hyodo | ................... | B62D 1/195 188/371 |
| 5,282,637 A * | 2/1994 | McCreadie | ............. | B62D 1/16 248/224.61 |
| 6,027,088 A * | 2/2000 | Stedman | ................ | B62D 1/195 248/200 |
| 6,276,740 B1 * | 8/2001 | Mellor | ................... | B21D 39/04 280/90 |
| 6,497,432 B2 * | 12/2002 | Scheib | ................. | B60H 1/0055 280/779 |
| 9,156,488 B1 * | 10/2015 | McCabe | ............. | B62D 25/145 |
| 2002/0056982 A1 * | 5/2002 | Brownlee | ................ | B62D 1/16 280/779 |
| 2002/0105204 A1 * | 8/2002 | Scheidel | ............. | B62D 25/145 296/70 |
| 2002/0117842 A1 * | 8/2002 | Takano | .................... | B62D 1/16 280/779 |
| 2005/0035585 A1 * | 2/2005 | Lee | ........................... | B60T 7/06 280/779 |
| 2007/0006986 A1 * | 1/2007 | Derleth | ................ | B60H 1/0055 162/234 |
| 2007/0057535 A1 * | 3/2007 | Wolf | ..................... | B29C 45/006 296/193.02 |
| 2007/0295141 A1 * | 12/2007 | Ball | ........................ | B62D 1/16 74/492 |
| 2008/0122264 A1 * | 5/2008 | Wrobel | ................ | B62D 21/157 296/203.02 |
| 2010/0140912 A1 | 6/2010 | Zornack et al. | | |
| 2010/0171339 A1 * | 7/2010 | Zornack | ............... | B62D 25/147 296/193.02 |
| 2010/0176262 A1 * | 7/2010 | Vican | ................... | B62D 25/147 248/250 |
| 2010/0244491 A1 * | 9/2010 | Baudart | ............... | B62D 25/145 296/193.02 |
| 2011/0278876 A1 * | 11/2011 | Hitz | ..................... | B62D 25/145 296/72 |
| 2013/0076016 A1 * | 3/2013 | Aoki | ....................... | B62D 1/16 280/779 |
| 2014/0327270 A1 * | 11/2014 | Baudart | ............... | B62D 25/145 296/193.02 |
| 2014/0333094 A1 * | 11/2014 | Matsushita | .......... | B62D 25/145 296/193.02 |
| 2014/0361572 A1 * | 12/2014 | Le Jaouen | ............... | B62D 1/16 296/72 |
| 2015/0136925 A1 * | 5/2015 | Van Schaik | ............. | B62D 1/16 248/231.91 |
| 2017/0305476 A1 * | 10/2017 | Kulkarni | .............. | B62D 25/145 |
| 2018/0001935 A1 * | 1/2018 | Michler | ................ | B62D 1/16 |

FOREIGN PATENT DOCUMENTS

| | | |
|---|---|---|
| DE | 102008026631 A1 | 12/2009 |
| DE | 102009026299 A1 | 2/2011 |
| JP | 2014084070 A | 5/2014 |
| WO | 2008009683 A1 | 1/2008 |

OTHER PUBLICATIONS

Written Opinion of the International Searching Authority dated May 11, 2017 in parent International application PCT/EP2016/050461.
Examiner's Report dated Aug. 29, 2017 in related Canadian application 2,970,124.

* cited by examiner

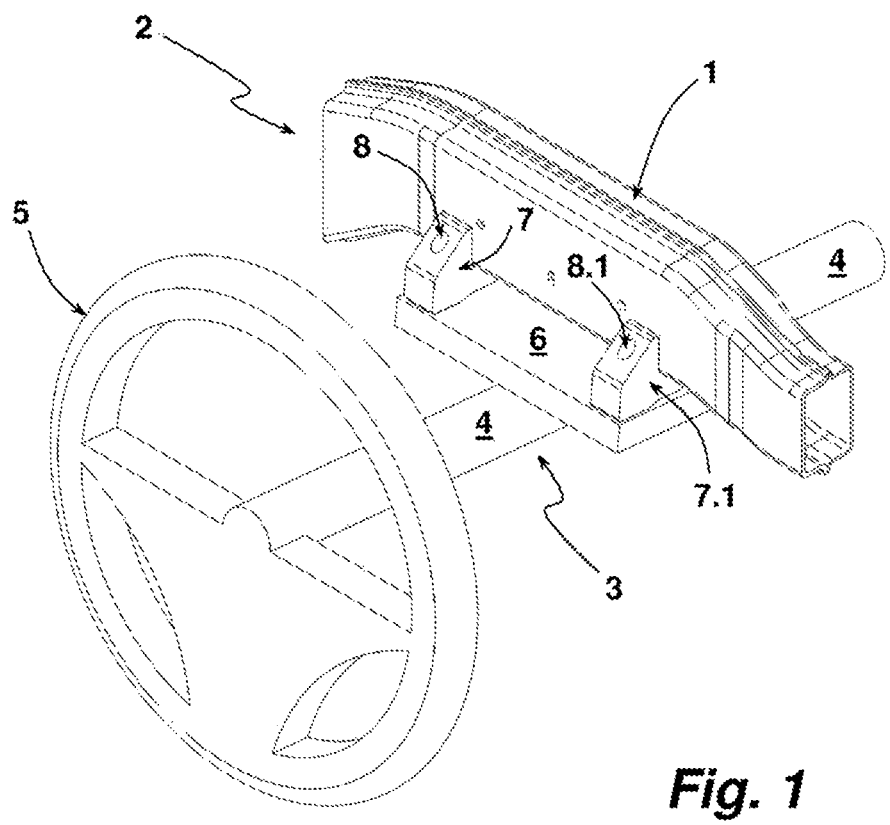
Fig. 1
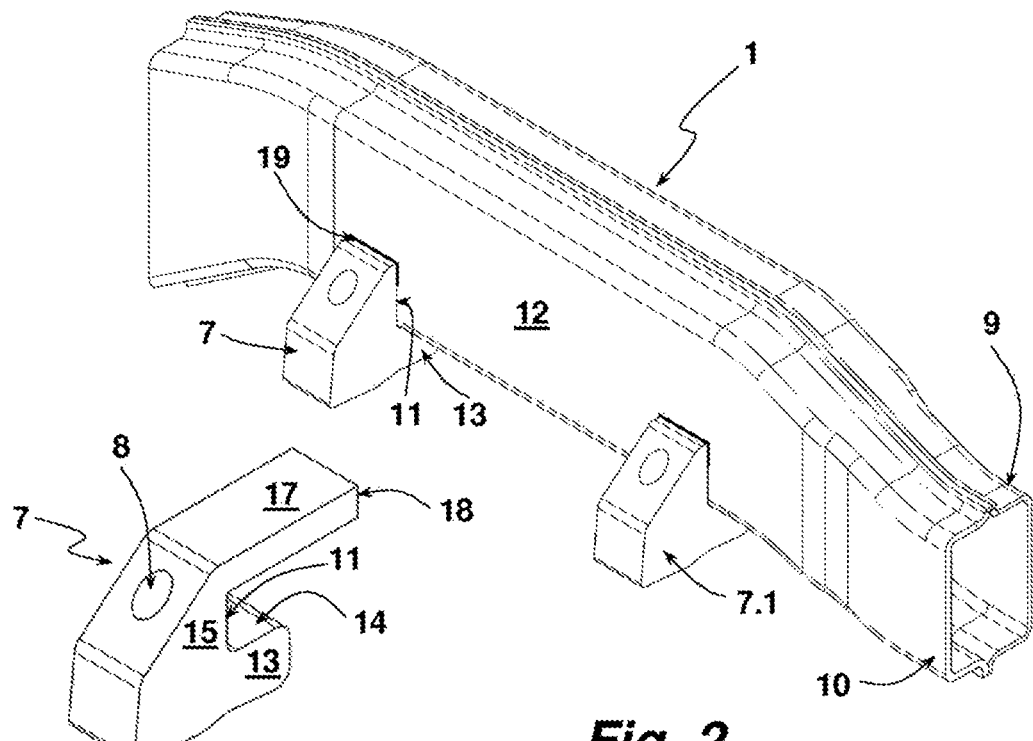
Fig. 2a
Fig. 2

State of the Art

MODULE SUPPORT ASSEMBLY FOR A MOTOR VEHICLE

BACKGROUND

The present disclosure relates to a module carrier assembly for a motor vehicle for positioning between the A-pillars of the vehicle body, having a transverse carrier extending between the A-pillars and configured as a hollow body profile, and having at least one steering column holder connected to the transverse carrier and supported at the outer side of the transverse carrier in the x-direction. As used herein, the x-direction corresponds to a vehicle's longitudinal axis; the y-direction is the horizontally transverse axis to the x-direction; and the z-direction corresponds to the vertical axis.

Such module carrier assemblies are situated between the A-pillars of a motor vehicle and carry instruments and other components arranged in the area of the dashboard of a vehicle, for example one or a plurality of airbags or the like. The center console is often also connected to such an assembly. Furthermore, the steering column or a steering column module including the steering column is connected to such an assembly. In addition to the steering column, such a steering column module may include steering-assist actuators or other components.

Module carrier assemblies of this type include a transverse carrier which extends between the two A-pillars of the vehicle and is connected to these A-pillars. In a plurality of cases, such transverse carriers, also referred to as cross car beams, are implemented as hollow chamber profiles. To be able to configure the desired geometries, such transverse carriers implemented as hollow chamber profiles are often implemented as a semi monocoque construction or as a closed profile, for example as a tube or extrusion profile. In such a case, the transverse carrier is composed of two half shells, the joining plane of the two half shells being approximately located in the y-z plane (the vertical transverse plane) and also approximately in the x-y plane (the horizontal transverse plane) of the vehicle. Such a transverse carrier includes a front half shell and a rear half shell, which as a general rule are intermaterially connected to each other, for example by joining.

The steering column connected to the transverse carrier of such a module carrier assembly is in operative connection with the steered wheels and extends, at least in the case of vehicles having a front engine, into the engine compartment. Vibrations are coupled into the steering column, which are caused by the steered wheels and/or by the operation of the engine when driving. These vibrations are transmitted to the steering wheel. By connecting the steering column or the steering column module to the module carrier assembly, vibrations are also coupled into their transverse carriers. On account of the size of the steering column or the entire steering column unit, which is connected to the module carrier assembly, its natural frequency is relatively low. When configuring steering columns or steering column modules, one strives to devise these steering columns or steering column modules preferably in such a manner that the natural frequency does not correspond to the natural frequency of the engine and differs from the natural frequency of the engine by a certain frequency spacing, in particular to avoid or at least reduce vibrations and/or structure-borne noise. As a general rule, a natural frequency of the engine of approximately 30 Hz is assumed. On this basis, it is often required that the steering column for use in a passenger car in the installed state has a natural frequency of at least 40 Hz. Using these measures, one would like to achieve that, in order to avoid disruptive noises, the steering column is excited by its natural frequency. This would perhaps not negatively affect the functional efficiency; however, it is perceived as disruptive.

Such a steering column or steering column module is connected to the transverse carrier of the module carrier assembly by means of at least one steering column holder. Such a steering column holder is, in principle, an angle piece which is supported on the outer side of the transverse carrier on the side of the steering wheel and engages having its other limb below the transverse carrier. Such a steering column holder is welded to the transverse carrier. As a general rule, the steering column itself is, by means of screws, connected on the side of the transverse carrier to the steering column holder(s). On account of the connection of the steering column to the transverse carrier of the module carrier assembly, this assembly also influences the vibration behavior of the steering column. Such a connection of the steering column or the steering column module to the transverse carrier may increase the natural frequency of the steering column by approximately 0.2 Hz.

To prevent undesirable vibrations in the vehicle and, in particular, in the vehicle interior, active damping systems have been developed, the actuators of which generate counter-vibrations, to eliminate vibrations which are possibly unpleasantly perceived. Such active damping systems for damping the vibrations at, for example, a module carrier assembly are known from DE 10 2004 013 343 A1 or DE 10 2005 030 934 A1. Even though such damping systems compensate for or counteract undesirable vibrations, these damping systems are complex and in many cases are not desired. These damping systems are located at the interface of the transverse carrier of the module carrier assembly and the respective A-pillar.

DE 10 2009 026 299 A1 discloses a cockpit carrier for a motor vehicle. The transverse carrier of this prior art is a box-shaped hollow body profile. Two steering column holders are connected thereto. Each steering column holder is configured as a flat part, manufactured from a sheet metal plate. According to the concept of the prior art, it is provided that the flat parts have cross-sectional wall elements—also referred to as partition elements—within the transverse carrier. In so doing, the transverse carrier is to be stiffened. These flat parts engage with their partition wall from below—and, thus, in the z-direction—into the transverse carrier. These flat parts extend over the entire cross-sectional area of the transverse carrier and are connected to the entire circumference of the inner contour of the transverse carrier. The partition elements protrude at the bottom from the transverse carrier. The actual part of each flat part, which is used for the steering column connection, extends only at a distance from the underside of the transverse carrier in the x-direction.

WO 2008/009683 A1 discloses an arrangement for attaching a steering column of a motor vehicle. The subject of this document is that the steering column holder is connected to the transverse carrier by two flanges forming a U-shaped accommodation. These flanges enclose the transverse carrier on the outer side, namely on the outer sides of the box-shaped transverse carrier facing the x-direction. The steering column itself is connected by holding means integrally formed on the U-shaped transverse-link accommodation. This document discloses that a threaded sleeve is provided, which extends from the outer side into the transverse carrier up to the inner side.

DE 10 2008 026 631 A1 discloses a dashboard support for a motor vehicle. The subject of this document is such a dashboard support having slots into which the limbs of steering column holders are insertable and therein adjustable to establish an intended positioning. For this dashboard support, it is not provided that the steering column holders are supported on an outer wall of the transverse carrier and configured as an angle piece, so as to in this manner enclose two sides of the transverse carrier.

The foregoing examples of the related art and limitations therewith are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tool and methods which are meant to be exemplary and illustrative, not limiting in scope. In various embodiments, one or more of the above described problems have been reduced or eliminated, while other embodiments are directed to other improvements.

Based on this state of the art, one aspect of the present disclosure is to develop a module carrier assembly of the type mentioned above in such a manner that the risk of an excitation of the steering column in its natural frequency is counteracted without having to use active damping systems.

This aspect may be achieved according to the present disclosure by a module carrier in which at least one steering column holder is configured as an angle piece and is supported by a support surface provided by a first limb of the steering column holder on a first outer wall of the transverse carrier. The steering column holder has a further limb, the upper side of which extends below the transverse carrier. The at least one steering column holder carries on its support surface, which is supported on the outer side of the transverse carrier, a support projection which extends through the outer wall of the transverse carrier adjoining the support surface of the steering column holder and up to at least the opposite wall of the transverse carrier, the support projection being connected to this wall in a vibration-coupled manner.

In this module carrier assembly according to the present disclosure, the steering column holder(s) is/are configured to be supported at opposing walls of the transverse carrier configured as a hollow-chamber profile. Such a steering column holder is may be manufactured as one piece. This support occurs at opposite walls, and namely not by a steering column holder engaging around the transverse carrier, but instead in that the steering column holder has a support projection which extends at least through a first wall of the transverse carrier up to the opposite wall or which engages with or passes through the opposite wall. Thus, this steering column holder includes a support surface which supports the steering column holder at the wall of the transverse carrier into which the support projection of the steering column holder engages. For this reason, with respect to the extension in the z-direction, the through-opening, through which the support projection passes through this first wall, is significantly smaller than the total height of this wall of the transverse beam available in this direction. In this way, a steering column holder of this kind is connected, on the one hand, to the outer wall or an outer wall section of the transverse carrier and, on the other hand, by way of its support projection to the wall section of the opposite wall facing this outer wall section. The total support surface of the steering column holder is thus formed by the support surface which supports the steering column holder on the first wall of the transverse carrier and by the surface or that section of the support projection which is supported on the opposite wall. This concept makes it possible to adapt the support surface assigned to the respective wall of the transverse carrier to the desired requirements. In this way, it is provided in one embodiment that the support surface of the steering column holder, by which the steering column holder is supported at the outer side of a first wall of the transverse carrier, is approximately twice as large as the end face of the support projection by which the steering column holder is supported at the inner side of the opposite wall of the transverse carrier. With respect to the height of the outer walls of the transverse carrier, it is provided according to one embodiment that the total support surface of the steering column holder is smaller than the available outer wall area portion of the transverse carrier in the alignment with the steering column holder in the z-direction.

The support projection is connected to the wall opposite the first wall or to the opposite wall section in such a manner that, with respect to transmitted vibrations, the support projection and the wall connected thereto can be referred to as one unit. This may be achieved, for example, by an intermaterial connection, such as by welding the two parts to each other. In addition to a positive connection of the support projection to this wall, an abutting of the end of the support projection at this wall under prestress is moreover possible. In this instance, a non-detachable connection may be provided. The support projection of such a steering column holder on the opposite wall of the transverse carrier is thus implemented in such a manner that an effective stiffening of the transverse carrier takes place by the support projection, and the support connection may also be realized via at least one inner side or outer side weld seam.

According to the present disclosure, a steering column holder may be implemented having a limb engaging below the transverse carrier, which then abuts by the upper side of this limb at the underside of the transverse carrier. In so doing, the contact surface on the outer side between the steering column holder and the transverse carrier is increased. In addition, such an embodiment makes it feasible to implement a longer connecting weld seam between the steering column holder and the transverse carrier. This limb of the steering column holder may be parallel to the extension of the support projection. If the transverse carrier is a shell-shaped construction, the front end face of this limb can act against or abut against the joining flange of the transverse carrier.

In principle, it is considered to be sufficient if the support projection abuts against the inner wall of the transverse carrier under prestress by its support-side end face, so that the non-positive connection is provided by this abutting. In another embodiment, the support projection is fixed in the region of its supporting end to the inner wall of the transverse carrier, for example by a joining connection. In order to make this possible, according to one embodiment, it is provided to introduce a joining through-opening in the wall of the transverse carrier where the support projection of the steering column holder is to be fixed. According to one embodiment, such a joining through-opening is smaller with regard to its opening width than the support surface of support projection of the steering column holder abutting against the inner side of the wall. The joining connection can then be implemented in the joining through-opening. In order to be able to produce a joining connection, it is not necessary for the end face of the support projection to abut against the inner wall. A small joining gap to be filled by a welding or soldering allowance is permissible. In general, in order to produce a suitable joining connection, it is considered to be sufficient if the end face of the support projection is spaced apart from the inner wall to be joined by not more than 0.5 mm from the joining surface. An embodiment in which the joining through-opening has a clearance is also possible, such that the support projection using an end section engages with the clearance or is even led out of the clearance, so that a joining connection between the supporting end of the support projection and the wall can then be made with respect to the circumference of the part of the support projection engaging in or passing through the through-opening. In such a configuration, a step-like design of the support end is also possible, the step being formed on the support projection so that the landing formed by the step abuts against the inner wall of the transverse carrier. When the supporting end of the support projection is, as described previously, designed having a step, there is also the possibility that the tapered part of the supporting end engages through a through-opening in the adjacent wall, and that the part of the supporting end projecting from the outer side of this wall is reshaped like a rivet in order to connect the support projection to this wall of the transverse support in a non-positive and/or intermaterial manner. Moreover, it is also conceivable that the bearing surface is designed in a step-shaped manner.

Surprisingly, it has been shown that with such a modular carrier assembly according to the present disclosure, the natural frequency of the steering column can be increased by at least about 1 Hz and, thus, the frequency spacing from vibration-inducing components, for example the engine of the vehicle, could be increased in a not inconsiderable manner. This increase in the natural frequency may seem slight in terms of a sheer number; however, in practice the increase is fairly significant, in particular without having to resort to active damping systems. This may be attributed to the skillful supporting and vibration introduction from the steering column or the steering column module into the transverse carrier of the module support assembly. In this instance, the concordant support at opposite walls of the transverse carrier is paramount. The measure described above is particularly effective if the extension of the support projection runs parallel or approximately parallel to the longitudinal extension of the steering column.

To provide the support limb, the support on the outer side wall and, if applicable, the limb, the steering column holder can be configured so that the steering column holder is provided with a bore running in the z-direction. This bore is used to engage fasteners for connecting a steering column module. For this purpose, these bores can be provided with an internal thread.

In addition to the exemplary aspects and embodiments described above, further aspects and embodiments will become apparent by reference to the accompanying drawings forming a part of this specification wherein like reference characters designate corresponding parts in the several views.

BRIEF DESCRIPTION OF THE DRAWINGS

The present disclosure is further described on the basis of a depicted embodiment in reference to the appended figures.

FIG. 1 shows a schematic perspective view of a transverse carrier of a module carrier assembly according to the present disclosure having a steering column module connected thereto;

FIG. 2 shows an enlarged view of the transverse carrier of the module carrier assembly of FIG. 1;

FIG. 2a shows a perspective view of one of the two steering column holders of FIG. 2;

Figure 3:
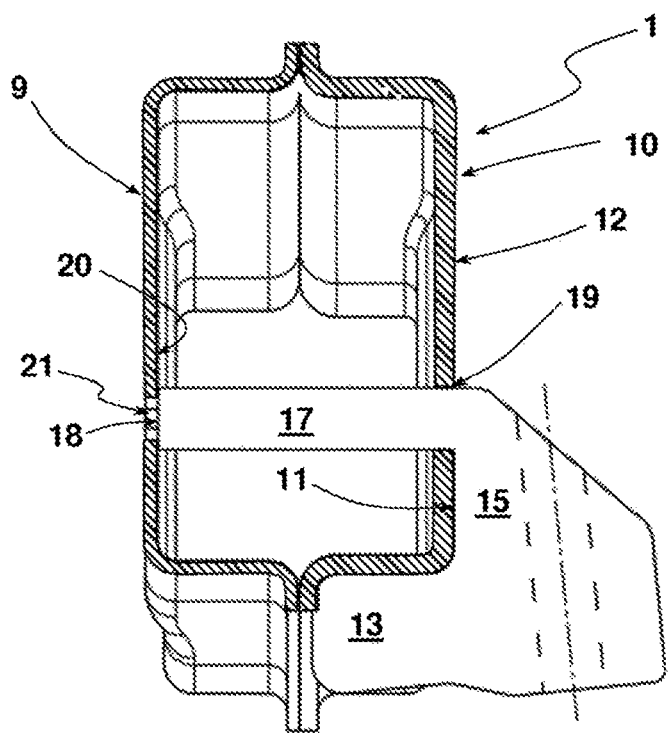
FIG. 3 shows a cross section through the transverse carrier of FIG. 2.

Before further explaining the depicted embodiments, it is to be understood that the invention is not limited in its application to the details of the particular arrangements shown, since the invention is capable of other embodiments. It is intended that the embodiments and figures disclosed herein are to be considered illustrative rather than limiting. Also, the terminology used herein is for the purposes of description and not limitation.

DETAILED DESCRIPTION

A transverse carrier 1, only partially illustrated in one section in FIG. 1, is part of a module carrier assembly 2. Only the section of transverse carrier 1 which has a craning for connecting a steering column module 3 is shown. Each end of the transverse carrier 1 (not shown) is connected to the inner side of an A-pillar of a motor vehicle respectively. A steering column module 3 having a schematically illustrated steering column 4 is fastened to transverse carrier 1 of module carrier assembly 2. Steering column module 3 is shown only having a few elements, namely having steering column 4 and having a steering wheel 5 connected thereto in the vehicle interior. By its end opposite steering wheel 5, steering column 4 is guided into the engine compartment of the vehicle and, in a manner not shown in detail, is thereto kinematically connected for steering the front wheels of the vehicle. To connect steering column module 3 to transverse carrier 1 of module carrier assembly 2, steering column module 3 has a connection plate 6. This connection plate is connected to two steering column holders 7, 7.1 assigned to module carrier assembly 2. It is quite possible for steering column module 3 to be additionally fastened to transverse carrier 1 by further means. For the connection of steering column module 3, steering column holders 7, 7.1 each have a bore 8, 8.1 which passes through the respective holder so that steering column module 3 can be connected by its connecting plate 6 with the aid of screws or the like to steering column holders 7, 7.1. Of course, the above-described connection of steering column module 3 to transverse carrier 1 is only illustrative and can be implemented in different ways; no limitation is intended or should be inferred. It is essential that the connection of steering column module 3 to transverse carrier 1 is non-positive.

Transverse carrier 1 of the illustrated embodiment is composed of two half shells 9, 10. Both half shells 9, 10 have a U-shaped profiling in cross section. The ends of the free limbs of the U-profiling are outwardly beveled to form respectively one bearing flange in this manner. The bearing flanges of each half shell adjoin the bearing flanges of the respective other half shell. In the region of the bearing flanges, the two half shells 9, 10 are connected to each other with the aid of a joining, for example by welding. In this way, a hollow chamber profile is formed, the cross-sectional geometry of which changes over the longitudinal extension of transverse carrier 1. It is also conceivable that transverse carrier 1 is produced as a closed hollow profile in the form of a tube or an extruded profile, which may be produced from a light metal such as aluminum or magnesium. In such a case, the bearing flanges are not required. Likewise, for an embodiment of the transverse carrier 1 with half shells, it is not absolutely necessary to form at least one bearing flange. Rather, the U-shaped half shells can also be situated in a flush or overlapping manner and be connected to each other.

FIG. 2 shows in an enlarged illustration of the section of transverse carrier 1 of FIG. 1, having the two steering column holders 7, 7.1 connected thereto. Subsequently, steering column holder 7 (see FIG. 2a) is described in greater detail. Since steering column holder 7.1 is identical to steering column holder 7, the following explanations apply equally to steering column holder 7.1.

Steering column holder 7 is implemented as an angle piece and includes a support surface 11 which abuts against outer side 12 of half-shell 10 of transverse carrier 1 facing steering wheel 5. In addition to limb 15 providing the support surface 11, steering column holder 7 has a further limb 13. The upper side 14 of limb 13 extends below half shell 10, and namely up to its joining flange in the depicted embodiment (see also FIG. 3).

In an approximately vertical direction, bore 8 passes through limb 15 of steering column holder 7 (which provides support surface 11). A screw for connecting steering column module 3 may be passed through bore 8. It is possible to equip bore 8 with an internal thread so that a fastening screw can be screwed by its screw shank into bore 8, the head of the fastening screw being supported on the underside of connecting plate 6 shown in FIG. 1, so that an interlocking of connection plate 6 to steering column holders 7, 7.1 is enabled.

Starting from its limb 15, with reference to the cross-sectional geometry of the half shell 10 in the illustrated embodiment, steering column holder 7 carries a support projection 17 parallel to the limb 13, which passes through half shell 10 and, with its front end face 18, extends up to the inner wall of opposite half shell 9 (see also FIG. 3). For this purpose, a through-opening 19 is formed into half shell 10, through which support projection 17 may be inserted. The support projection supports itself via end face 18 on inner side 20 of the wall of half shell 9 opposite outer side 12 of half shell 10.

In order to connect support projection 17 intermaterially to half shell 9, a through-opening 21 is introduced into half shell 9 in one embodiment. As can be seen from FIG. 3, the depicted through-opening 21 is smaller in terms of its dimension than the surface occupied by end face 18 of support projection 17. In this instance, through-opening 21 of the joining is situated in such a manner that end face 18 is supported at inner wall 20 with respect to this through-opening 21 of the joining. Expediently, through-opening 21 of the joining is situated at the center with respect to end face 18 of support projection 17. Through-opening 21 of the joining may intermaterially connect support projection 17 to half shell 20 in this through-opening by a joining process, for example by welding. The cross section shown in FIG. 3 merely shows the arrangement of the individual parts relative to each other; however, it does not show the joining connections necessary for a intermaterial connection of steering column holder 7 to transverse carrier 1.

In the illustrated embodiment, the support surface of supporting projection 17 provided by end face 18 is approximately half as large as support surface 11 of limb 15. Moreover, it becomes evident from FIG. 3 that the supporting height required by steering column holder 7 on transverse carrier 1 only measures a height which corresponds to less than 50% of the total height of transverse carrier 1. In the shown embodiment, only about one third of the height of transverse carrier 1 is required for the intended support of steering column holder 7.

In addition to the joining connection between half shell 9 and supporting projection 17, which is made via joining at through-opening 21, holder 7 is also connected in the region of its limb 15 to outer side 12 of half shell 10 by one or a plurality of joining connections.

The illustration of the support of steering column holder 7 at or in transverse carrier 1 in FIG. 3 shows that not only transverse carrier 2 is stiffened by the special support, but also that, via respective steering column holder 7 or 7.1, a force is skillfully and directly introduced in the same direction, and thus concordantly, into both half shells 9, 10 of transverse carrier 1. Unexpectedly, it has been shown that these measures were able to increase the natural frequency of the steering column installed in the vehicle in a not inconsiderable manner, namely by approximately 1 Hz.

Steering column holder 7 can be manufactured by way of a casting process from a metal suitable for this purpose. Likewise, it is possible to form the steering column holder as a section of an extruded profile. It goes without saying that also other configurations can be used as well.

Figure 4:
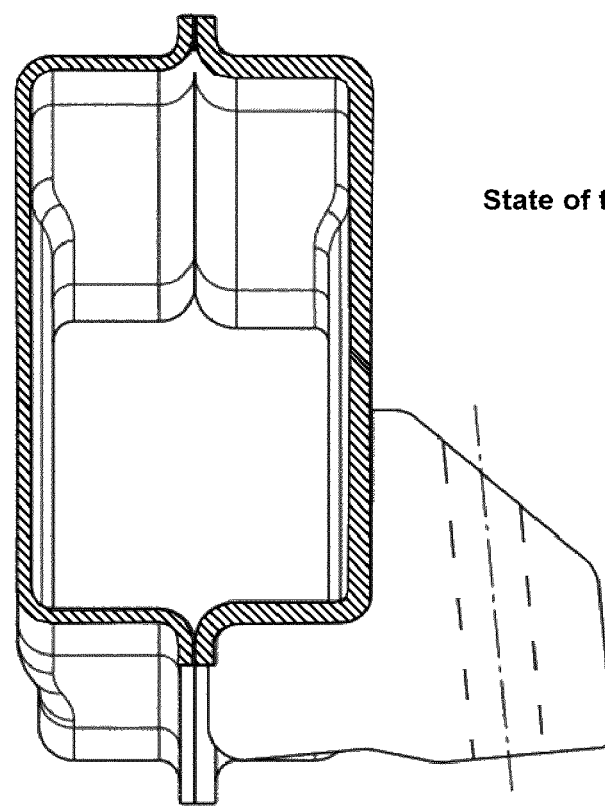
FIG. 4 shows a steering column holder connected to a transverse carrier of a module carrier assembly according to the prior art in the same view as FIG. 3.

FIG. 4 shows a steering column holder connected to a transverse carrier of a module carrier assembly according to the prior art, for comparison to a module carrier assembly 2 according to the present disclosure. The module carrier assembly according to the prior art has steering column holders, which are connected by a joining connection to a half shell on the side facing the steering wheel, but do not have a projection which passes through this half shell and which is supported at the inner side of the other half shell.

Figure 5:
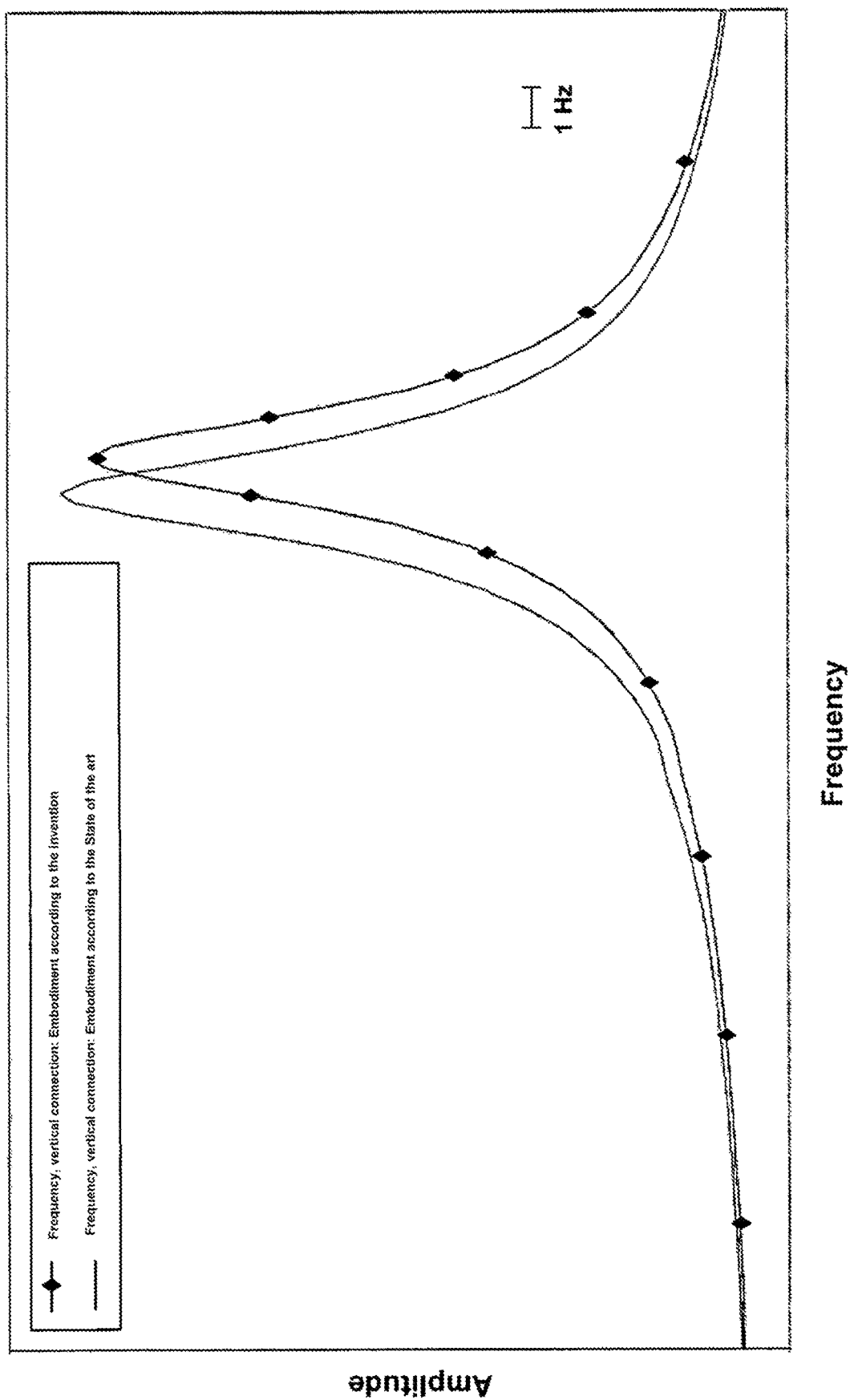
FIG. 5 shows a diagram illustrating the natural frequency increase when using a module carrier assembly according to the present disclosure vis-a-vis a steering column connection according to the prior art.

By way of comparison, FIG. 5 shows the vertical frequency of steering column 4 or of steering column module 3 for a connection of the steering column or steering column module to transverse carrier 1 of module carrier assembly 2 using steering column holders according to the present disclosure as previously described (see, for example, FIG. 3), compared to a connection of the steering column module using steering column holders according to the prior art (see FIG. 4). It can be clearly seen that when using the module support assembly according to the present disclosure having its special steering column holders 7, 7.1, the natural frequency is increased in a not inconsiderable manner.

While a number of exemplary aspects and embodiments have been discussed above, those of skill in the art will recognize certain modifications, permutations, additions and sub-combinations therefore. It is therefore intended that the following appended claims hereinafter introduced are interpreted to include all such modifications, permutations, additions and sub-combinations, which are within their true spirit and scope. Each embodiment described herein has numerous equivalents.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims. Whenever a range is given in the specification, all intermediate ranges and subranges, as well as all individual values included in the ranges given are intended to be included in the disclosure. When a Markush group or other grouping is used herein, all individual members of the group and all combinations and sub-combinations possible of the group are intended to be individually included in the disclosure.

In general the terms and phrases used herein have their art-recognized meaning, which can be found by reference to standard texts, journal references and contexts known to those skilled in the art. The above definitions are provided to clarify their specific use in the context of the invention.

LIST OF REFERENCE CHARACTERS 1 transverse carrier
1 module carrier assembly
3 steering column module
4 steering column
5 steering wheel
6 connection plate
7, 7.1 steering column holder
8, 8.1 bore
9 half shell
10 half shell
11 support surface
12 outer side
13 limb
14 upper side
15 limb
17 support projection
18 end face
19 through-opening
20 inner side
21 joining through-opening

What is claimed is:

1. A module carrier assembly for a motor vehicle for positioning between A-pillars of a vehicle body, the module carrier assembly comprising:
   a transverse carrier adapted to extend between and to be connected to the A-pillars;
   the transverse carrier configured as a hollow body profile having a first wall and a second wall;
   the first wall and the second wall facing in an x-direction, the x-direction being parallel to a longitudinal axis of the motor vehicle; and
   at least one steering column holder connected to the transverse carrier and retained at an outer side of the first wall in the x-direction, the at least one steering column holder configured as an angle piece and including a support surface provided by a first limb of the at least one steering column holder which abuts against the outer side of the first wall of the transverse carrier;
   the at least one steering column holder having a second limb, an upper side of the second limb extending below the transverse carrier abutting an underside of the transverse carrier;
   the at least one steering column holder carries a support projection projecting from said support surface, the support projection extending through the first wall of the transverse carrier and extending at least to the second wall of the transverse carrier, the support projection being connected in a vibration-coupled manner to the second wall of the transverse carrier.

2. The module carrier assembly of claim 1, wherein the support projection of the at least one steering column holder has an extension parallel to and configured to be connected to a longitudinal extension of a steering column.

3. The module carrier assembly of claim 1, wherein an end face of the support projection is connected under prestress to the second wall of the transverse carrier.

4. The module carrier assembly of claim 1, wherein the second wall of the transverse carrier has a support projection accommodation where an end face of the support projection is located.

5. The module carrier assembly of claim 1, wherein the second wall of the transverse carrier which adjoins an end face of the support projection has a joining through-opening in an area of the end face of the support projection and wherein the end face of the support projection is connected to the second wall via a joining connection in the joining through-opening.

6. The module carrier assembly of claim 1, further comprising two steering column holders positioned at a distance from each other along a longitudinal extension of the transverse carrier.

7. The module carrier assembly of claim 1, wherein the transverse carrier is implemented as an extrusion profile made from a light metal.

8. The module carrier assembly of claim 1, wherein the transverse carrier has a semi monocoque construction.

9. The module carrier assembly of claim 8, wherein the transverse carrier has a front half shell and a rear half shell.

10. The module carrier assembly of claim 9, wherein the front half shell and the rear half shell each have an approximate U-shaped cross section and free ends of the U-shaped cross section are beveled for forming a bearing flange.

* * * * *